(12) United States Patent
Lee

(10) Patent No.: US 9,007,319 B2
(45) Date of Patent: Apr. 14, 2015

(54) METHOD AND APPARATUS FOR CONTROLLING DISPLAY AREA OF FLEXIBLE DISPLAY DEVICE, AND RECORDING MEDIUM STORING THE SAME

(71) Applicant: Samsung Display Co., Ltd., Yongin, Gyeonggi-Do (KR)

(72) Inventor: Wook-Jae Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 98 days.

(21) Appl. No.: 13/791,229

(22) Filed: Mar. 8, 2013

(65) Prior Publication Data

US 2014/0098037 A1 Apr. 10, 2014

(30) Foreign Application Priority Data

Oct. 8, 2012 (KR) .................. 10-2012-0111386

(51) Int. Cl.
*G06F 3/041* (2006.01)
*G06F 3/0488* (2013.01)
*G06F 1/16* (2006.01)
*G06F 3/01* (2006.01)

(52) U.S. Cl.
CPC ............ *G06F 3/041* (2013.01); *G06F 3/04886* (2013.01); *G06F 1/1652* (2013.01); *G06F 3/017* (2013.01); *G06F 2203/04102* (2013.01)

(58) Field of Classification Search
CPC ... G06F 3/04886; G06F 3/017; G06F 3/0416; G06F 3/0488; G06F 3/1446; G06F 2203/04102; G06F 1/1652
USPC .................. 345/173–184; 715/788, 792, 863
See application file for complete search history.

(56) References Cited

U.S. PATENT DOCUMENTS

| | | | |
|---|---|---|---|
| 8,624,855 B2 * | 1/2014 | Weiss et al. ................... | 345/173 |
| 8,692,778 B2 * | 4/2014 | Kim .............................. | 345/173 |
| 2008/0291225 A1 * | 11/2008 | Arneson ........................ | 345/698 |
| 2009/0267870 A1 | 10/2009 | Schellingerhout et al. | |
| 2010/0245267 A1 | 9/2010 | Min et al. | |

FOREIGN PATENT DOCUMENTS

| | | |
|---|---|---|
| KR | 10-2008-0091145 A | 10/2008 |
| KR | 1020090033976 A | 4/2009 |
| KR | 1020090043781 A | 5/2009 |
| KR | 10-2010-0109274 A | 10/2010 |
| KR | 1020120047612 A | 5/2012 |

* cited by examiner

*Primary Examiner* — Ariel Balaoing
*Assistant Examiner* — Larry Sternbane
(74) *Attorney, Agent, or Firm* — Robert E. Bushnell, Esq.

(57) ABSTRACT

An apparatus for controlling a display area of a flexible display device includes a display area and a display unit to which a touch is input. A method of using the apparatus includes obtaining a first input signal, a second input signal, a third input signal, and a fourth input signal that are input to the display unit by a user's touch and respectively correspond to a first line element, a second line element, a third line element, and a fourth line element on the display unit, determining whether the first to fourth input signals are for controlling the display area, and setting the display area based on a closed loop composed of the obtained first to fourth line elements and first and second edge portions of the display unit if it is determined that the first to fourth input signals are for controlling the display area.

23 Claims, 9 Drawing Sheets

METHOD AND APPARATUS FOR CONTROLLING DISPLAY AREA OF FLEXIBLE DISPLAY DEVICE, AND RECORDING MEDIUM STORING THE SAME

CLAIM OF PRIORITY

This application makes reference to, incorporates the same herein, and claims all benefits accruing under 35 U.S.C. §119 from an application earlier filed in the Korean Intellectual Property Office on 8 Oct. 2012 and there duly assigned Serial No. 10-2012-0111386.

BACKGROUND OF THE INVENTION

1. Field of the Invention

Embodiments of the present invention relate to a method and an apparatus for controlling a display area of a flexible display device, and more particularly, to a method and an apparatus for controlling a display area of a deformed flexible display device including a display unit on which an image is displayed and to which a touch is input.

2. Description of the Related Art

Recently, with the development of display technology, flexible display devices that may be folded and rolled are under study and development.

An organic light-emitting display panel has excellent characteristics, for example, large viewing angles, better contrast characteristics, and low power consumption, and thus, its application is expanding from a portable media device, such as an MP3 player and a mobile phone, to TVs. Also, an organic light-emitting display panel is a self-emitting device and thus does not need an additional light source; therefore, an organic light-emitting display panel is small and light in weight.

Such an organic light-emitting display panel may be formed to be flexible by using a plastic panel, and may have an improved flexibility by reducing a thickness thereof. A flexible display device may be used as a three-dimensional (3D) type display device as well as a flat type display device when the flexible display device deforms as an advantage of its flexibility. The 3D type display device may be deformed in various ways by users or according to situations of using the flexible display device. Also, if a display area in which an image is displayed is fixed, users may feel inconvenienced in using a deformed flexible display device.

SUMMARY OF THE INVENTION

Embodiments of the present invention provide a method and an apparatus for controlling a display area of a flexible display device including a display unit on which an image is displayed and to which a touch is input.

Embodiments of the present invention also provide a method of controlling a display area of a flexible display device including the display area, on which an image displayed, and a display unit to which a touch is input. The method includes obtaining a first input signal, a second input signal, a third input signal, and a fourth input signal that are input to the display unit by a user's touch and respectively correspond to a first line element, a second line element, a third line element, and a fourth line element on the display unit, determining whether the first to fourth input signals are for controlling the display area by using a time when the obtained first to fourth input signals are input or a similarity of gradients of the first to fourth line elements, and setting the display area based on a closed loop composed of the obtained first to fourth line elements and a first and a second edge portions of the display unit if it is determined that the first to fourth input signals are for controlling the display area. Each of the first to fourth line elements is connected from any one of the first edge portion and the second edge portion facing the first edge portion to the other one.

The determining of whether the first to fourth input signals are for controlling the display area may include determining that the input signals are for controlling the display area if a difference in time between when an input of the first input signal is finished and when an input of the third input signal starts and a difference in time between when an input of the second input signal is finished and when an input of the fourth input signal starts are below a first threshold time. A first drag signal may include the first input signal and the third input signal, and a second drag signal may include the second input signal and the fourth input signal.

The determining of whether the first to fourth input signals are for controlling the display area may include determining that the input signals are for controlling the display area if each of a difference in time between when inputs of the first and second drag signals start and a difference in time between when inputs of the first and second drag signals are finished is below a second threshold time.

The determining of whether the first to fourth input signals are for controlling the display area may include determining that the input signals are for controlling the display area if the input of the second drag signal starts within a third threshold time after the input of the first drag signal is finished.

The flexible display device may be modified into a spiral structure, and the first drag signal and the second drag signal may be input by a user's successive touches corresponding to a spin-axis direction of the spiral structure.

The display area may include at least two discrete regions that are spaced apart from each other on the display unit, and the setting of the display area may include setting a first discrete region from an internal area of a first closed loop composed of the first and second line elements and the first and second edge portions, and setting a second discrete region from an internal area of a second closed loop composed of the third and fourth line elements and the first and second edge portions.

The method may further include generating an output signal for dividing an image and displaying the divided image in the at least two discrete regions that are set in the setting of the display area.

The setting of the display area may include setting the first discrete region comprised in the internal area of the first closed loop and the second discrete region comprised in the internal area of the second closed loop in consideration of the gradients of the first to fourth line elements.

The determining of whether the first to fourth input signals are for controlling the display area may include determining that the input signals are for controlling the display area if a time to input all the first to fourth input signals is below a fourth threshold time.

The determining of whether the first to fourth input signals are for controlling the display area may include determining that the input signals are for controlling the display area if a difference between the gradients of the first to fourth line elements is within a margin of error.

According to an aspect of the present invention, there is provided an apparatus for controlling a display area of a flexible display device including the display area, on which an image displayed, and a display unit to which a touch is input. The apparatus includes a signal obtaining unit for obtaining a first input signal, a second input signal, a third input signal, and a fourth input signal that are input to the display unit by a user's touch and respectively correspond to a first line element, a second line element, a third line element, and a fourth line element on the display unit, a determination unit for determining whether the first to fourth input signals are for controlling the display area by using a time when the obtained first to fourth input signals are input or a similarity of gradients of the first to fourth line elements, and a display area setting unit for setting the display area based on a closed loop composed of the obtained first to fourth line elements and a first and a second edge portions of the display unit if it is determined that the first to fourth input signals are for controlling the display area. Each of the first to fourth line elements is connected from any one of the first edge portion and the second edge portion facing the first edge portion to the other one.

The determination unit may determine that the input signals are for controlling the display area if a difference in time between when an input of the first input signal is finished and when an input of the third input signal starts and a difference in time between when an input of the second input signal is finished and when an input of the fourth input signal starts are below a first threshold time. A first drag signal may include the first input signal and the third input signal, and a second drag signal may include the second input signal and the fourth input signal.

The determination unit may determine that the input signals are for controlling the display area if each of a difference in time between when inputs of the first and second drag signals start and a difference in time when inputs of the first and second drag signals are finished are below a second threshold time.

The determination unit may determine that the input signals are for controlling the display area if the input of the second drag signal starts within a third threshold time after the input of the first drag signal is finished.

The flexible display device may be modified into a spiral structure, and the first drag signal and the second drag signal may be input by a user's successive touches corresponding to a spin-axis direction of the spiral structure.

The display area may include at least two discrete regions that are spaced apart from each other on the display unit, and the display area setting unit may set a first discrete region from an internal area of a first closed loop composed of the first and second line elements and the first and second edge portions, and may set a second discrete region from an internal area of a second closed loop composed of the third and fourth line elements and the first and second edge portions.

The apparatus may further include an output signal generating unit for generating an output signal for dividing an image and displaying the divided image in the at least two discrete regions that are set in the setting of the display area.

The display area setting unit may set the first discrete region comprised in the internal area of the first closed loop and the second discrete region comprised in the internal area of the second closed loop in consideration of the gradients of the first to fourth line elements.

The determination unit may determine that the input signals are for controlling the display area if a time to input all the first to fourth input signals is below a fourth threshold time.

The determination unit may determine that the input signals are for controlling the display area if a difference between the gradients of the first to fourth line elements is within a margin of error.

According to another aspect of the present invention, there is provided a computer-readable recording medium having embodied thereon a computer program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
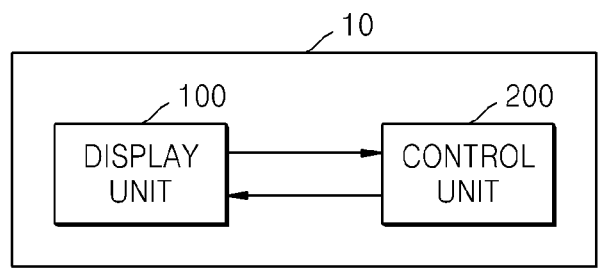
FIG. 1 is a block diagram of a configuration of a flexible display device constructed as an embodiment according to the principles of the present invention.

Hereinafter, the present invention will be described more fully with reference to the accompanying drawings, in which exemplary embodiments of the invention are shown. The present invention may, however, be embodied in many different forms and should not be construed as limited to the exemplary embodiments set forth herein. Rather, these embodiments are provided so that this disclosure will be thorough and complete, and will fully convey the scope of the invention to those of ordinary skilled in the art. The terminology used herein is for the purpose of describing particular embodiments only and is not intended to be limiting of the present invention.

In the drawings, the thicknesses of layers and regions are exaggerated for clarity. Like reference numerals in the drawings denote like elements, and thus their description will be omitted.

It will be further understood that the terms "comprises' and/or 'comprising,' when used in this specification, specify the presence of stated features, integers, operations, elements, and/or components, but do not preclude the presence or addition of one or more other features, integers, operations, elements, components, and/or groups thereof. It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section. Expressions such as "at least one of," when preceding a list of elements, modify the entire list of elements and do not modify the individual elements of the list.

FIG. 1 is a block diagram of a configuration of a flexible display device 10 constructed as an embodiment according to the principles of the present invention. Referring to FIG. 1, the flexible display device 10 may include a display unit 100 that includes a display area in which an image is displayed and to which a touch is input, and a control unit 200 for controlling the display area based on an input signal that is input to the display unit 100 by a user's touch. The flexible display device 10 constructed as an embodiment according to the principles of the present invention has flexibility to be folded and rolled, and thus the flexible display device 10 may be easily stored and portable. Also, the flexible display device 10 may be used by deforming the flexible display device 10 according to a usage environment or a user' desire. Deforming the flexible display device 10 may include bending, unbending, folding, unfolding, rolling, unrolling, or the like, but the present invention is not limited thereto. The deformed flexible display device 10 may form various shapes. Thus, an image appropriate for the deformed flexible display device 10 may be provided, and a user interface controlling the deformed flexible display device 10 may be provided. The display unit 100 of the flexible display device 10 may be an organic light-emitting display panel, a liquid crystal display panel, or the like, but the present invention is not limited thereto. Although the display unit 100 of FIG. 1 includes a top emission type organic light-emitting display panel, the present invention is not limited thereto. Alternatively, the display unit 100 may include a bottom emission type or a dual emission type light-emitting display panel.

Figure 2:
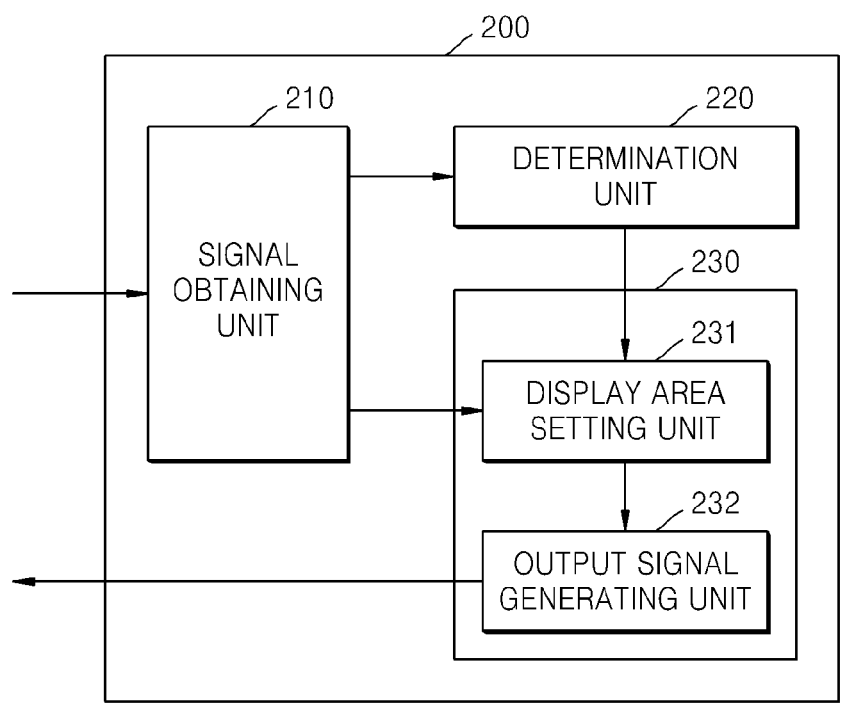
FIG. 2 is a block diagram showing a detailed configuration of a control unit shown in FIG. 1.

FIG. 2 is a block diagram showing a detailed configuration of a control unit 200 shown in FIG. 1. Referring to FIG. 2, the control unit 200 may include a signal obtaining unit 210, a determination unit 220, and a display area control unit 230.

The signal obtaining unit 210 obtains a first input signal, a second input signal, a third input signal, and a fourth input signal that are input to the display unit 100 by a user's touch and respectively correspond to a first line element L1, a second line element L2, a third line element L3, and a fourth line element L4 on the display unit 100. In order to improve readability of the specification, the four line segments depicted in FIGS. 3, 4, 7A, 7B, 8A & 8B are referred to as L1, L2, L3 & L4. Here, each of the first to fourth line elements L1 to L4 is connected from any one of a first edge portion 110 (see FIG. 3) of the display unit 100 and a second edge portion 120 (see FIG. 3), which faces the first edge portion 110, to the other one. The first to fourth line elements L1 to L4 may face one another.

According to an embodiment of the present invention, the display unit 100 may receive a touch signal. For example, a user may touch the display unit 100 to input first to fourth input signals to the display unit 100, or the user may touch the display unit 100 by using a separate device or an input device connected to the display unit 100. Alternatively, the user may directly touch the display unit 100 by using a body part, but the present invention is not limited thereto.

Here, the first to fourth input signals respectively corresponding to the first to fourth line elements L1 to L4 include linear information. As such, in order to input the first to fourth input signals including linear information, a user may drag on a surface of the display unit 100, or may touch at least two points of the display unit 100. When the user drags on the surface of the display unit 100, linear information corresponding to a drag path may be generated. On the other hand, when the user touches at least two points of the display unit 100, linear information passing through the points may be generated. Here, the drag refers to an input method in which the user starts an input at one point and finishes the input at the other point. A drag input may be successive inputs. A drag may be input by using a touch; alternatively, a drag signal may be input by using the above-described method.

Figure 3:
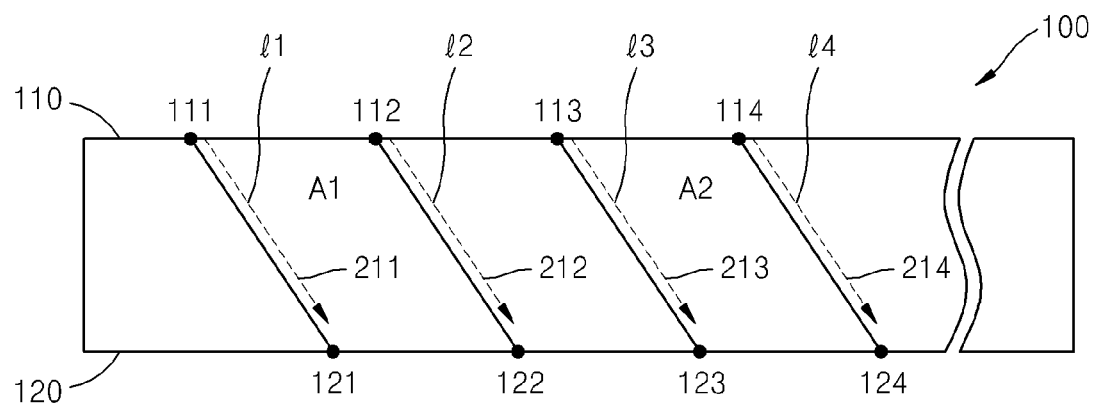
FIG. 3 is a schematic diagram showing a display unit on which first through fourth line elements are displayed, according to an embodiment of the present invention.

FIG. 3 is a schematic diagram showing the display unit 100 on which the first to fourth line elements L1 to L4 are displayed, according to an embodiment of the present invention. Referring to FIG. 3, the display unit 100 may further include an additional support unit, in which an image is not displayed, at an edge of a display panel, or alternatively, the display unit 100 may be entirely configured as a display panel. Hereinafter, a part of an edge of the display unit 100 is referred to as the first edge portion 110, and another part of the edge of the display unit 100, which faces to the first edge portion 110, is referred to as the second edge portion 120.

The first to fourth line elements L1 to L4 according to an embodiment of the present invention may connect the first edge portion 110 and the second edge portion 120 of the display unit 100. For this, a user may input the first to fourth input signals by dragging from one of the first edge portion 110 and the second edge portion 120 of the display unit 100 to the other one.

Each of the first to fourth line elements L1 to L4 may be connected from any one of the first edge portion 110 and the second edge portion 120, which faces the first edge portion 110, of the display unit 100 to the other one.

For example, as shown in FIG. 3, the first line element L1 may connect a point 111 on the first edge portion 110 and a point 121 on the second edge portion 120, the second line element L2 may connect a point 112 on the first edge portion 110 and a point 122 on the second edge portion 120, the third line element L3 may connect a point 113 on the first edge portion 110 and a point 123 on the second edge portion 120, and the fourth line element L4 may connect a point 114 on the first edge portion 110 and a point 124 on the second edge portion 120. Here, the first to fourth line elements L1 to L4 do not cross one another to face one another.

The first to fourth line elements L1 to L4 may be defined by input signals respectively corresponding to the first to fourth line elements L1 to L4. FIG. 3 shows a first input signal 211 defining the first line element L1, a second input signal 212 defining the second line element L2, a third input signal 213 defining the third line element L3, and a fourth input signal 214 defining the fourth line element L4 as dashed lines. Although FIG. 3 shows that the first to fourth line elements L1 to L4 are separated from the first to fourth input signals 211 to 214 respectively corresponding to the fourth line elements L1 to L4, locations where the first to fourth input signals 211 to 214 are input may overlap with locations of the first to fourth line elements L1 to L4 respectively corresponding to the first to fourth input signals 211 to 214.

Also, the first to fourth input signals 211 to 214 may be drag signals that are input along the first to fourth line elements L1 to L4 respectively corresponding to the first to fourth input signals 211 to 214 or may be signals that touch a plurality of points on the first to fourth line elements L1 to L4. Besides, the first to fourth input signals 211 to 214 respectively corresponding to the first to fourth line elements L1 to L4 may be input by using various methods, or the first to fourth line elements L1 to L4 respectively corresponding to the first to fourth input signals 211 to 214 may be defined by the first to fourth input signals 211 to 214.

The determination unit 220 shown in FIG. 2 determines whether the first to fourth input signals 211 to 214 are for controlling the display area by using the time when the first to fourth input signals 211 to 214 obtained by the signal obtaining unit 210 are input or the similarity of gradients of the first to fourth line elements L1 to L4.

The determination unit 220 determines whether the first to fourth input signals 211 to 214 respectively corresponding to the first to fourth line elements L1 to L4 are for controlling the display area of the display unit 100. In other words, the determination unit 220 determines whether the first to fourth input signals 211 to 214 respectively corresponding to the first to fourth line elements L1 to L4 are signals that are input in accordance with a user's intention to control the display area of the display unit 100. For this, the determination unit 220 may use the time when the first to fourth input signals 211 to 214 obtained by the signal obtaining unit 210 are input or the similarity of gradients of the first to fourth line elements L1 to L4.

First, an example where the determination unit 220 determines whether the first to fourth input signals 211 to 214 are for controlling the display area by using the time when the first to fourth input signals 211 to 214 are input will be described. For example, the determination unit 220 may determine that the first to fourth input signals 211 to 214 are for controlling the display area if a difference in time between when an input of the first input signal 211 is finished and when an input of the third input signal 213 starts and a difference in time between when an input of the second input signal 212 is finished and when an input of the fourth input signal 214 starts are below a first threshold time.

When the first threshold time is extremely short, for example, the input of the third input signal 213 may start right after the input of the first input signal 211 is finished, and the input of the fourth input signal 214 may start right after the input of the second input signal 212 is finished. In other words, the first input signal 211 and the third input signal 213 may be sequentially input, and the second input signal 212 and the fourth input signal 214 may be sequentially input. Hereinafter, this condition will be referred to as a first condition. Also, hereinafter, an input signal including the first input signal 211 and the third input signal 213 and an input signal including the second input signal 212 and the fourth input signal 214 will be referred to as a first drag signal and a second drag signal, respectively.

Accordingly, the first threshold time may be set to an appropriate value in consideration of the time between two input signals of the same drag signal, i.e., the time it takes for a user to finish one input signal and then to start another input signal of the same drag signal, and the like. For example, the first threshold time may be experimentally set to a most appropriate value, or may be set to a value that may vary depending on a user's experience by being updated based on a speed at which the user inputs a drag signal. Alternatively, a user may manually adjust the first threshold time in a user interface provided by the flexible display device.

Figure 4:
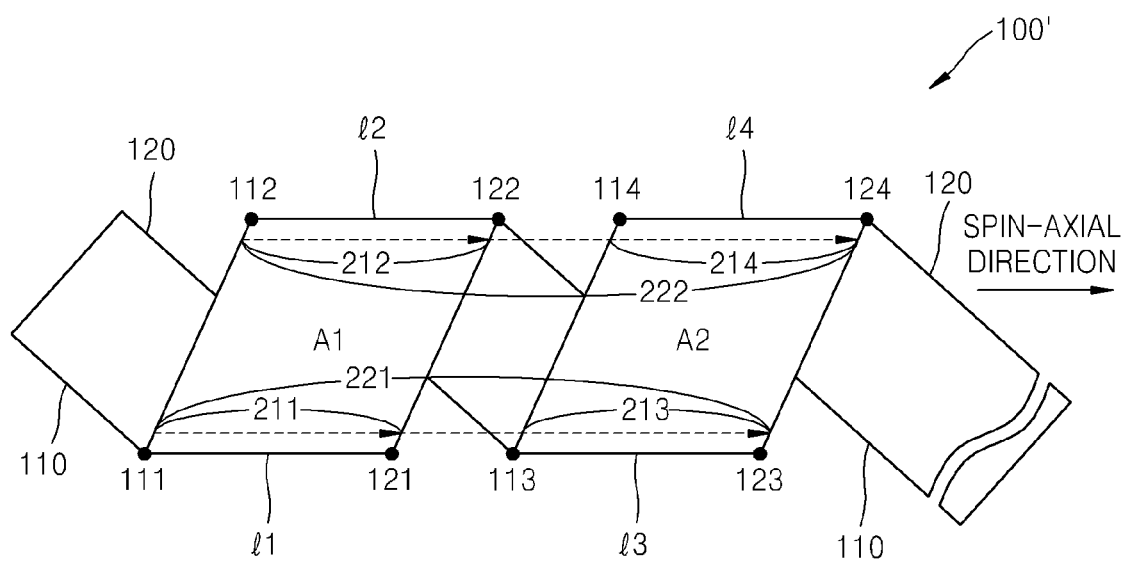
FIG. 4 is a schematic diagram showing a modified display unit on which first and second drag signals are displayed, according to another embodiment of the present invention.

FIG. 4 shows a modified display unit 100' including first and second drag signals 221 and 222. Referring to FIG. 4, the flexible display device 10 may be modified into a spiral structure by deforming the flexible display unit, and the first and second drag signals 221 and 222 may be obtained by a user's successive touches (drags) corresponding to a spin-axis direction of the spiral structure of the modified display unit 100'.

In this case, the signal obtaining unit 210 may obtain the first drag signal 221 including the first input signal 211 and the third input signal 213, and the second drag signal 222 including the second input signal 212 and the fourth input signal 214 to obtain the first to fourth input signals 211 and 214.

Referring to FIG. 4, the first drag signal 221 includes the first input signal 211 and the third input signal 213, and the second drag signal 222 includes the second input signal 212 and the fourth input signal 214. Since the first to fourth input signals 211 to 214 respectively correspond to the first to fourth line elements L1 to L4, the first drag signal 221 corresponds to the first and third line elements L1 and L3, and the second drag signal 222 corresponds to the second and fourth line elements L2 and L4. Thus, the first and third line elements L1 and L3 may be defined by the first drag signal 221, and the second and fourth line elements L2 and L4 may be defined by the second drag signal 222.

Although FIG. 4 shows a case where the flexible display device 10 is modified into a spiral structure, the present invention is not limited. Thus, the flexible display device 10 may be modified into any of various stereoscopic structures under different situations. Accordingly, a user may input the drag signal, including a plurality of input signals, on the modified display unit 100'.

Hereinafter, another example where the determination unit 220 determines whether the first to fourth input signals 211 to 214 are for controlling the display area by using the time when the first to fourth input signals 211 to 214 are input will be described. For example, the determination unit 220 may determine that the first to fourth input signals 211 to 214 are for controlling the display area if a difference in time between when each of inputs of the first and second drag signals 221 and 222 starts and a difference in time between when each of inputs of the first and second drag signals 221 and 222 is finished are below a second threshold time.

When the second threshold time is extremely short, for example, the inputs of the first and second drag signals 221 and 222 may start and be finished nearly at the same time. This condition will be referred to as a second condition.

Accordingly, the second threshold time may be set to an appropriate value in consideration of the time difference when the first and second drag signals are simultaneously inputted. For example, the second threshold time may be experimentally set to a most appropriate value, or may be set to a value that may vary depending on a user's experience by being updated based on the user's habits in simultaneously inputting two drag signals. Alternatively, a user may manually adjust the second threshold time in a user interface provided by the flexible display device.

Figure 5:
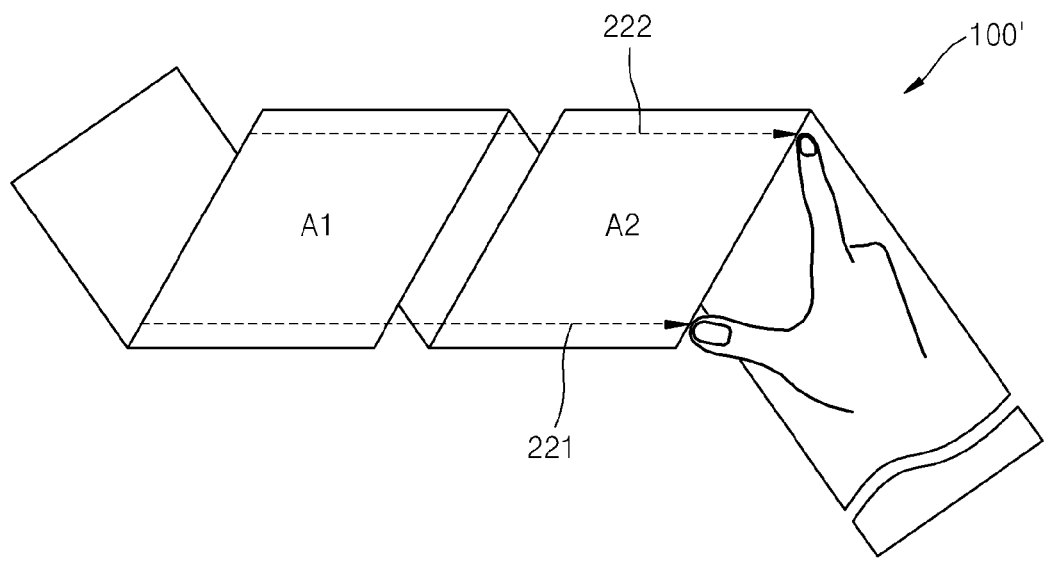
FIG. 5 shows an example of inputting first and second drag signals satisfying a second condition, according to an embodiment of the present invention.

FIG. 5 shows an example of inputting the first and second drag signals 221 and 222 satisfying the second condition, according to an embodiment of the present invention. Referring to FIG. 5, a user may start and finish the inputs of the first drag signal 221 and the second drag signal 222 nearly at the same time in order to input the first and second drag signals 221 and 222, which satisfy the second condition, to the modified display unit 100'. As such, inputting a plurality of input signals simultaneously is referred to as a multi-input.

At this time, the user may simultaneously input a plurality of input signals by using a plurality of input devices that are separately formed or attached to the modified display unit 100' for performing the multi-input as described above, or alternatively, the user may simultaneously input a plurality of input signals by directly touching the modified display unit 100' by using a body part.

Although FIG. 5 shows an example of inputting the first and second drag signals 221 and 222 satisfying the second condition by a user using two fingers, the present invention is not limited thereto. Thus, the user may input the first and second drag signals 221 and 222 satisfying the second condition by using any of various other methods.

For example, the user may input the first and second drag signals 221 and 222 satisfying the second condition by both touching and dragging an area between the first drag signal 221 and the second drag signal 222 by using a contiguous area of the user's body part. Alternatively, the user may input the first and second drag signals 221 and 222 satisfying the second condition by both touching and dragging an area between the first drag signal 221 and the second drag signal 222 by using an input device that is separately formed or attached to the modified display unit 100'.

Another example where the determination unit 220 determines whether the first to fourth input signals 211 to 214 are for controlling the display area by using the time when the first to fourth input signals 211 to 214 are input will be described. For example, the determination unit 220 may determine that the first to fourth input signals 211 to 214 are for controlling the display area if the input of the second drag signal 222 starts within a third threshold time after the input of the first drag signal 221 is finished.

In other words, the first drag signal 221 and the second drag signal 222 may be sequentially input by using, for example, a method of finishing the input of any one of the first drag signal 221 and the second drag signal 222 and then starting the input of the other one. At this time, the time between when the input of any one of the first drag signal 221 and the second drag signal 222 is finished and when the input of the other one starts may be below the third threshold time. This condition will be referred to as a third condition. At this time, according to which signal is first input, the second drag signal 222 may be input after the input of the first drag signal 221 is finished, or alternatively, the first drag signal 221 may be input after the input of the second drag signal 222 is finished.

Since the second drag signal 222 is input after the input of the first drag signal 221 is completely finished, the third threshold time may not necessarily be extremely short. However, if the third threshold time is set to an extremely long time, even when the plurality of input signals are actually separate input signals for different user interfaces instead of being signals for controlling the display area, an error, in which the determination unit 220 determines that the input signals are for controlling the display area, may occur.

Accordingly, the third threshold time may be set to an appropriate value in consideration of the time it takes for a user to input sequential drags, the time it takes for a user to finish one drag input and then to start another drag input, and the like. For example, the third threshold time may be experimentally set to a most appropriate value, or may be set to a value that may vary depending on a user's experience by being updated based on a speed at which the user inputs the sequential drags. Alternatively, a user may manually adjust the third threshold time in a user interface provided by the flexible display device.

Figure 6:
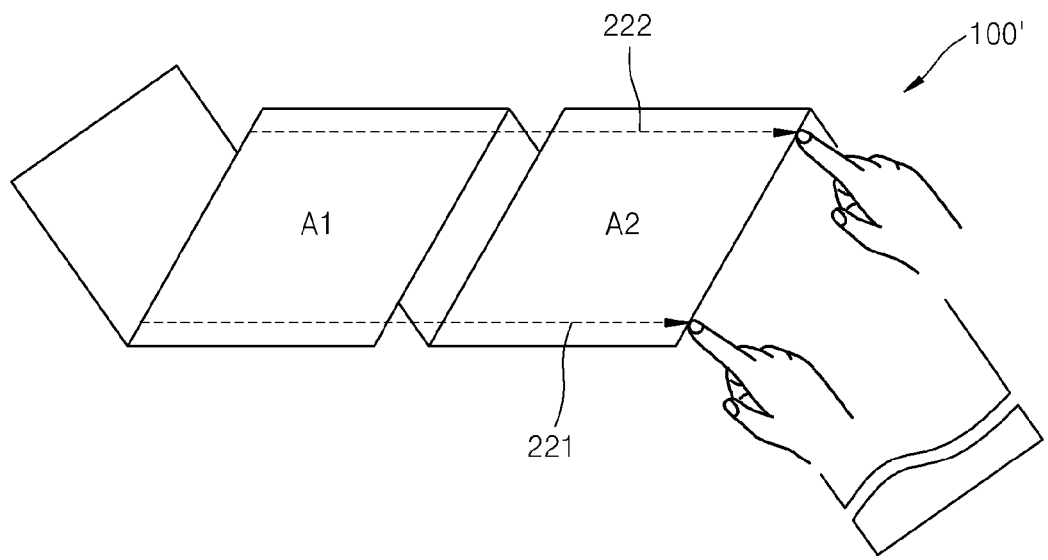
FIG. 6 shows an example of inputting first and second drag signals satisfying a third condition, according to an embodiment of the present invention.

FIG. 6 shows an example of inputting the first and second drag signals 221 and 222 satisfying the third condition, according to an embodiment of the present invention. Referring to FIG. 6, a user may input any one of the first and second drag signals 221 and 222 and then input the other one in order to input the first and second drag signals 221 and 222, which satisfy the third condition, to the modified display unit 100'.

At this time, in order to input the first and second drag signals 221 and 222 satisfying the third condition, the user may sequentially input a plurality of input signals by using input devices that are separately formed or attached to the modified display unit 100', as described above. Alternatively, the user may sequentially input a plurality of input signals by directly touching the modified display unit 100' by using a body part.

Although FIG. 6 shows an example of inputting the first and second drag signals 221 and 222 satisfying the third condition by a user using a finger, the present invention is not limited thereto. Thus, the user may input the first and second drag signals 221 and 222 satisfying the third condition by using any of various other methods.

When the user inputs the first and second drag signals 221 and 222 satisfying the third condition, the user may determine upper and lower orientations of an image by using the order of inputting the first drag signal 221 and the second drag signal 222. For example, the user may first input the drag signal corresponding to a coordinate at which the upper orientation of the image is to be set, and then may input the drag signal corresponding to a coordinate at which the lower orientation of the image is to be set. In this case, the determination unit 220 may determine that the first and second drag signals 221 and 222 are for setting the display area in which the coordinate corresponding to the drag signal, which is first input, is set to the upper orientation and the coordinate corresponding to the drag signal, which is input later, is set to the lower orientation. This is an example in which the determination unit 220 sets the upper and lower orientation of the display area, but the present invention is not limited thereto, and thus any of various other methods may be used.

When a signal satisfying the second condition is input, the signal obtaining unit 210 may obtain the first and second drag signals 221 and 222 that are simultaneously input when a user inputs the signals by touching the display unit. Similarly, when a signal satisfying the third condition is input, the signal obtaining unit 210 may obtain the first and second drag signals 221 and 222 that are sequentially input when a user inputs the signals by touching the display unit.

Another example where the determination unit 220 determines whether the first to fourth input signals 211 to 214 are for controlling the display area by using the time when the first to fourth input signals 211 to 214 are input will be described. For example, the determination unit 220 may determine that the first to fourth input signals 211 to 214 are for controlling the display area if the time to input all the first to fourth input signals 211 to 214 is below a fourth threshold time.

When the signal obtaining unit 210 obtains the first to fourth input signals 211 to 214 by obtaining the first drag signal 221, which includes the first input signal 211 and the third input signal 213, and the second drag signal 222, which includes the second input signal 212 and the fourth input signal 214, the determination unit 220 may determine that the first to fourth input signals 211 to 214 are for controlling the display area if the time to input both the first drag signal 221 and the second drag signal 222 is below the fourth threshold time.

In other words, the inputs of all the first to fourth input signals 211 to 214 may be finished within the fourth threshold time from the time when the input of the input signal, which is first input, starts. When the signal obtaining unit 210 obtains the first to fourth input signals 211 to 214 by obtaining the first drag signal 221, which includes the first input signal 211 and the third input signal 213, and the second drag signal 222, which includes the second input signal 212 and the fourth input signal 214, the inputs of the first drag signal 221 and the second drag signal 222 may be finished within the fourth threshold time from the time when the input of any one of the first drag signal 221 and the second drag signal 222, which is first input, starts.

For example, the fourth threshold time may be experimentally set to a most appropriate value, or may be set to a value that may vary depending on a user's experience by being updated based on the user's habits in input the first and second drag signals. Alternatively, a user may manually adjust the fourth threshold time in a user interface provided by the flexible display device.

Hereinafter, this condition will be referred to as a fourth condition. In other words, the fourth condition is a condition of setting a total limited time in obtaining the input signals.

The fourth condition is a condition for determining that the input signal is not for controlling the display area, when a difference in time between when an input of one drag signal starts and when the input of the drag signal is finished is excessively great, or a difference in time between when inputs of a plurality of drag signals start or a difference in time between when the inputs of a plurality of drag signals are finished is excessively great. That is, when the inputs of all input signals are finished within a predetermined limited time, the determination unit 220 may determine that the input signals are for controlling the display area.

Next, an example where the determination unit 220 determines whether input signals are for controlling the display area by using the similarity of the gradients of the first to fourth line elements L1 to L4 will be described. For example, the determination unit 220 may determine that the input signals are for controlling the display area if a difference in gradient between the first to fourth line elements L1 to L4 is within a margin of error. At this time, if the difference in gradient between the first to fourth line elements L1 to L4 is within a margin of error, it is determined that the first to fourth line elements L1 to L4 face one another. Here, the gradient may be an angle formed by the first and second edge portions 110 and 120 (see FIG. 3) and each of the first to fourth line elements L1 to L4. Here, assuming that the margin of error is extremely small, it may be determined that the first to fourth line elements L1 to L4 are parallel to one another. This condition will be referred to as a fifth condition.

For example, even though the first to fourth input signals 211 to 214 are input so as not to cross one another, if the similarity of the gradients of the first to fourth line elements L1 to L4 corresponding to the fourth input signals 211 to 214 is low, that is, if the gradients of the first to fourth line elements L1 to L4 are different from one another, the first to fourth input signals 211 to 214 may be input signals for executing another user interface instead of setting the display area.

For example, the determination unit 220 may calculate the gradients of the first to fourth line elements L1 to L4 by using the angle formed by the first and second edge portions 110 and 120 of the display unit 100 and the first to fourth line elements L1 to L4. For this, the determination unit 220 may determine that the first to fourth input signals 211 to 214 are for controlling the display area if a difference between angles formed by a straight line vertically passing through the first edge portion 110 and the second edge portion 120 of the display unit 100 and each of the first to fourth line elements L1 to L4 is within a margin of error.

Alternatively, if a difference (a first delta) between the gradients of the first and second line elements L1 and L2 is within a margin of error, if a difference (a second delta) between the gradients of the third and fourth line elements L3 and L4 is within a margin of error, and if a difference between the first delta and the second delta is within a margin of error, the determination unit 220 may determine that the first to fourth input signals 211 to 214 are for controlling the display area.

The margin of error regarding the geometric relationships among the first to fourth line elements L1 to L4, i.e., the gradients of the first to fourth line elements L1 to L4, may be experimentally set to a most appropriate value. For example, the margin of error may be set to an appropriate value in consideration of the statistics data of gleaned from the users' inputting behavior. For another example, the margin of error may be set to a value that may vary depending on a user's experience by being updated based on a user's input behavior. Alternatively, a user may manually adjust the margin of error in a user interface provided by the flexible display device.

Alternatively, when the determination unit 220 selects two line elements according to all the number of cases of selecting two of the first to fourth line elements L1 to L4, if a difference between gradients of the selected two line elements is within a margin of error, the determination unit 220 may determine that the first to fourth input signals 211 to 214 are for controlling the display area.

If the first to fourth input signals 211 to 214 satisfy any one of the first to fourth conditions under different conditions, the determination unit 220 may determine that the first to fourth input signals 211 to 214 are for controlling the display area. Alternatively, if the first to fourth input signals 211 to 214 satisfy any one of the first to fourth conditions, the determination unit 220 may determine that the first to fourth input signals 211 to 214 are for controlling the display area. The determination of which one of the first to fifth conditions should be determined will be performed in various ways under different conditions.

For example, the second condition is a condition where the first and second drag signals 221 and 222 are simultaneously input, and the third condition is a condition where the first and second drag signals 221 and 222 are sequentially input, and thus the determination unit 220 may determine that the first to fourth input signals 211 to 214 are for controlling the display area if the first and second drag signals 221 and 222 satisfy any one of the second condition and the third condition.

Also, the order of determining the first to fourth conditions may vary. The order of determining the first to fourth conditions may be set in various ways under different conditions.

Although the above-described conditions have been described by setting a discrete region by using the first to fourth input signals 211 to 214 as one unit, the present invention is not limited thereto. The present invention may be used in a case of setting three or more discrete regions by using five or more input signals under different conditions. The above-described conditions of the determination unit 220 may be determined by using the same method of determining the conditions with respect to the first to fourth input signals 211 to 214 even though the number of input signals exceeds four. Thus, the display area may be controlled by using at least five input signals.

For example, the determination unit 220 may generate a first group of the first to fourth input signals 211 to 214, a second group of third to sixth input signals, and a third group of fifth to eighth input signals, and may determine whether the first to sixth input signals satisfy the conditions by applying the above-described method of determining whether the first to fourth input signals satisfy the conditions to each of the first to third groups.

At this time, if any one of the first to third groups does not satisfy the conditions, the determination unit 220 does not determine whether the input signals satisfy the conditions with respect to the remaining groups and determines that a user's input is not for controlling the display area, and thus the process may be finished. Alternatively, if only some of the first to third groups satisfy the conditions, the determination unit 220 may determine that signals of the groups satisfying the conditions are for controlling the display area.

Referring back to FIG. 2, if the determination unit 220 determines that the first to fourth input signals 211 to 214 are for controlling the display area, the display area control unit 230 shown in FIG. 2 controls the display area. As shown in FIG. 2, the display area control unit 230 may include a display area setting unit 231 and an output signal generating unit 232.

If the determination unit 220 determines that the first to fourth input signals 211 to 214 are for controlling the display area, the display area setting unit 231 sets the display area based on a closed loop composed of the first to fourth line elements L1 to L4 and the first and second edge portions 110 and 120. The display area may include a plurality of discrete regions. For example, the display area setting unit 231 may set a first discrete region from an internal area of a first closed loop composed of the first and second line elements L1 and L2 and the first and second edge portions 110 and 120, and may set a second discrete region from an internal area of a second closed loop composed of the third and fourth line elements L3 and L4 and the first and second edge portions 110 and 120. At least two discrete regions that are set by the display area setting unit 231 may be spaced apart from each other on the display unit. Hereinafter, the discrete regions will be described with reference to FIGS. 7A and 7B.

Figure 7A:
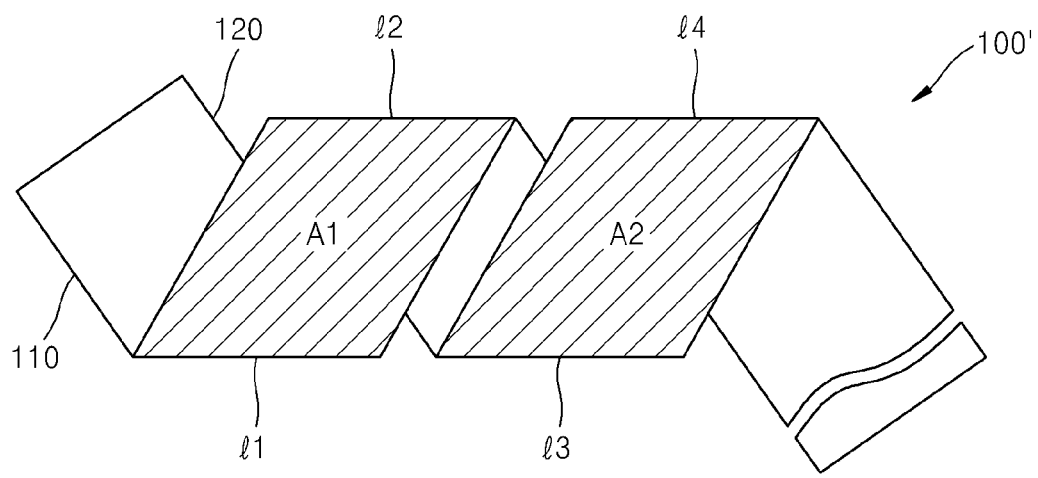
FIG. 7A is a schematic diagram showing a modified display device including a plurality of discrete regions that are set by a display area setting unit, according to an embodiment of the present invention.

FIG. 7A shows the modified display device 100' including the plurality of discrete regions that are set by the display area setting unit 231, according to an embodiment of the present invention. Referring to FIG. 7A, the display area setting unit 231 may set the internal area of the first closed loop composed of the first line element L1, the first edge portion 110, the second line element L2, and the second edge portion 120 to a first discrete region A1, and may set the internal area of the second closed loop composed of the third line element L3, the first edge portion 110, the fourth line element L4, and the second edge portion 120 to a second discrete region A2.

Figure 7B:
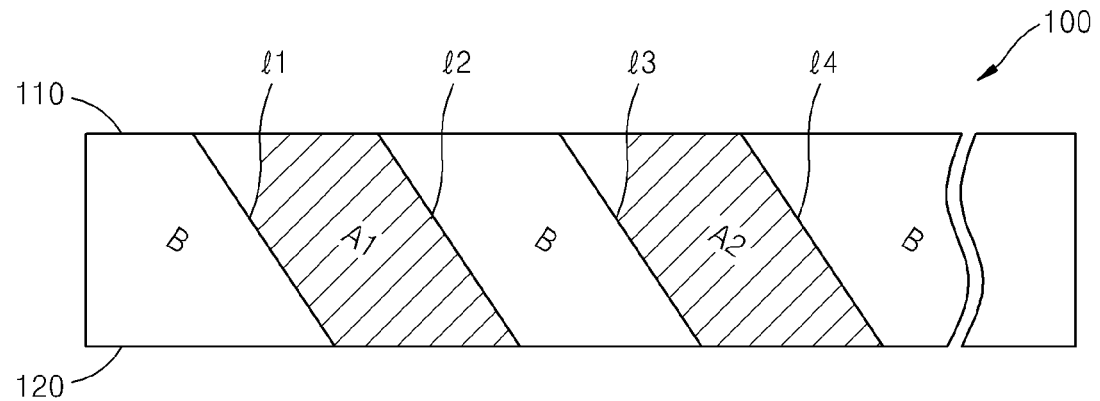
FIG. 7B is a schematic diagram showing a display device that is expanded and includes the plurality of discrete regions shown in FIG. 7A, according to an embodiment of the present invention.

FIG. 7B shows a display device that is expanded and includes the plurality of discrete regions shown in FIG. 7A. An area B shown in FIG. 7B may be a non-display area where an image is not displayed or may be an area in which a dummy image is displayed. Accordingly, the display unit 100 may include the first and second discrete regions A1 and A2 and the non-display area B. Alternatively, controlling of the area B may be separately performed from controlling of the display area according to an embodiment of the present invention, and thus the area B may be an area where a separate image is displayed. In this case, the display unit 100' when deformed according to the embodiment shown in FIG. 7A may simultaneously provide an images, or a video clip, or a user interface on each of the display area A1, A2 and the display area B (B is not shown in FIG. 7A). Thus, the display unit 100' may allow two users to independently use one of the display areas at the same time without interfering each other.

If the determination unit 220 determines that the first to fourth input signals 211 to 214 are for controlling the display area, the display area setting unit 231 may set the first discrete region A1 included in the internal area of the first closed loop and the second discrete region A2 included in the internal area of the second closed loop in consideration of the gradients of the first to fourth line elements L1 to L4.

For example, the display area setting unit 231 may set a part of the internal area of the first closed loop as the first discrete region A1 and may set a part of the internal area of the second closed loop as the second discrete region A2 in consideration of the gradients of the first to fourth line elements L1 to L4. Hereinafter, the first and second discrete regions A1 and A2 will be described with reference to FIGS. 8A and 8B.

Figure 8A:
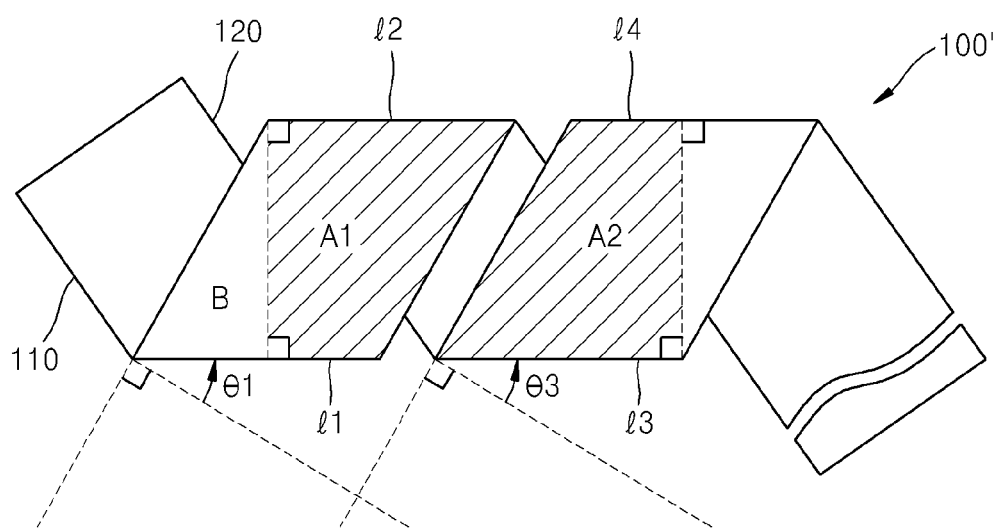
FIG. 8A is a schematic diagram showing a modified display device including a plurality of discrete regions that are set by a display area setting unit, according to another embodiment of the present invention.

FIG. 8A shows the modified display device 100' including the first and second discrete regions A1 and A2 that are set by the display area setting unit 231, according to another embodiment of the present invention. Referring to FIG. 8A, the display area setting unit 231 may set an area (filled in with diagonal lines in FIG. 8A) surrounded by a line, which vertically extends toward the first line element L1 at an intersection point between the second line element L2 and the first edge portion 110, the first line element L1, the second edge portion 120, and the second line element L2 as the first discrete region A1, and may set an area (filled in with diagonal lines in FIG. 8A) surrounded by a line, which vertically extends toward the fourth line element L4 at an intersection point between the third line element L3 and the second edge portion 120, the fourth line element L4, and the first edge portion 110 as the second discrete region A2. The first discrete region A1 is still included in the internal area of the first closed loop, and the second discrete region A2 is still included in the internal area of the second closed loop.

Figure 8B:
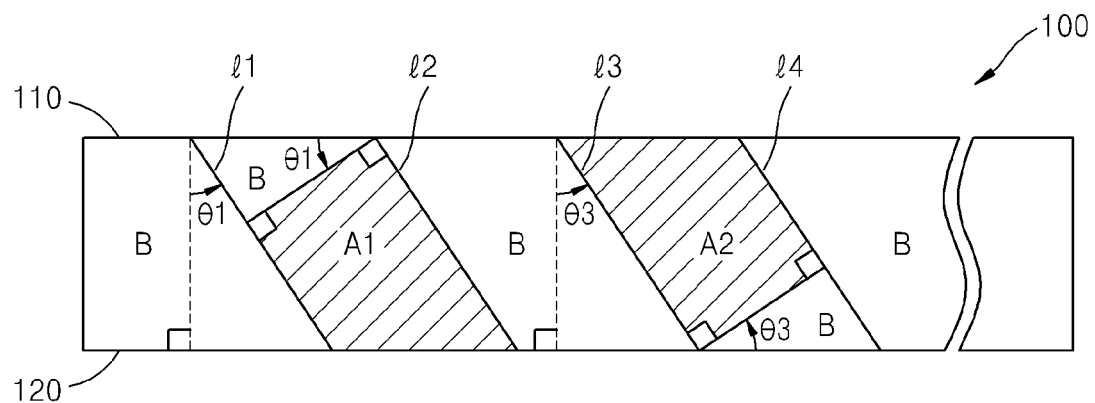
FIG. 8B a schematic diagram showing a display device that is expanded and includes the discrete regions shown in FIG. 8A.

FIG. 8B shows the display device 100 that is expanded and includes the first and second discrete regions A1 and A2 shown in FIG. 8A. An area B shown in FIG. 8B may be a non-display area where an image is not displayed or may be an area in which a dummy image is displayed. Alternatively, controlling of the area B may be separately performed from controlling of the display area according to an embodiment of the present invention, and thus the area B may be an area where a separate image is displayed. Accordingly, the display unit 100 may include the first and second discrete regions A1 and A2 and the non-display area B.

In FIGS. 8A and 8B, the first and second discrete regions A1 and A2 are set as a trapezoidal shape by using the lines that respectively vertically extend toward different line elements from the intersection points between the line elements and the edge portion, and the display area shown in the modified display device 100' is set as a quadrangle in which all vertices are right angles, but this is just an example. According to another example, the right angles (90 degrees) shown in FIGS. 8A and 8B may be replaced with any other angle. In this case, the entire display area shown in the modified display device 100' may not have a quadrangular shape in which all vertices are right angles.

Hereinafter, a method of selecting two of the plurality of line elements constituting a closed loop according to the above-described method will be described. For example, the display area setting unit 231 may select two line elements constituting each of the first and second closed loops. The first closed loop is composed of the line element corresponding to the input signal, which is first input among the input signals included in the first drag signal 221, the line element corresponding to the input signal, which is first input among the input signals included in the second drag signal, and the first and second edge portions 110 and 120. The second closed loop is composed of the line element, which is input for the second time among the input signals included in the first drag signal 221, the line element corresponding to the input signal, which is input for the second time among the input signals included in the second drag signal, and the first and second edge portions 110 and 120. However, this is just an example, and the display area setting unit 231 may select two line elements constituting each closed loop, among the plurality of line elements.

Referring back to FIG. 2, the output signal generating unit 232 generates an output signal for dividing an image and displaying the divided image in at least two discrete regions that are set by the display area setting unit 231.

Figure 9A:
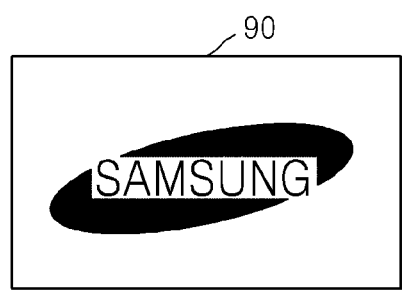
FIG. 9A shows an original image to be displayed on a display area according to an embodiment of the present invention.

At this time, the discrete regions may be formed to have a parallelogram shape as shown in FIG. 7A or a trapezoidal shape as shown in FIG. 8A. The output signal generating unit 232 may divide and display an image so as to be appropriate for the shape of the at least two discrete regions that are set by the display area setting unit 231 in consideration of the shape of the at least two discrete regions, which is shown in FIGS. 9A through 9D. FIG. 9A shows an original image 90 to be displayed on the display area.

Figure 9B:
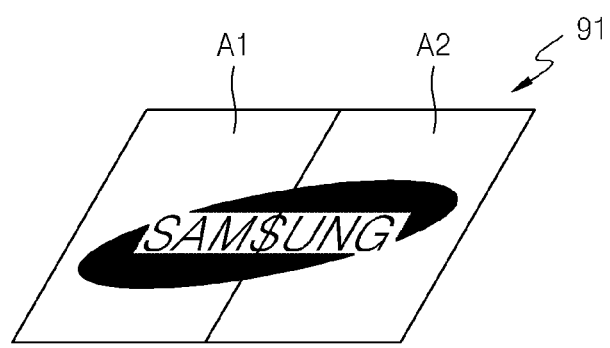
FIG. 9B shows an image displayed on a plurality of discrete regions according to an embodiment of the present invention.

FIG. 9B shows an image displayed on the first and second discrete regions A1 and A2. Referring to FIG. 9B, the first and second discrete regions A1 and A2 have an inclined parallelogram shape as shown in FIG. 7A, and thus the entire display area shown in the modified display device 100' has an inclined parallelogram shape. In this case, the output signal generating unit 232, in outputting the output signal, may allow the image, which is divided and displayed on the at least two discrete regions and displayed, to be modified to be appropriate for the shape of the discrete region and displayed. For example, the output signal generating unit 232 may set a coordinate of the image displayed on the plurality of discrete regions in consideration of the gradients of the first to fourth line elements L1 to L4.

For example, the output signal generating unit 232 may change coordinate information of the original image 90 to be displayed on the display area in consideration of the gradients of the first to fourth line elements L1 to L4 and the shape of the display area, and may generate the output signal for dividing an image 91 of which a coordinate has been changed into at least two discrete regions and displaying the divided image 91.

Referring to FIG. 9B, the output signal generating unit 232 may change the coordinate information of the original image 90 in consideration of a tilt angle of the display area, and may generate the output signal for dividing the inclined image into at least two discrete regions in response to the tilt angle of the display area according to the changed coordinate, and displaying the inclined image. The tilt angle of the display area may be determined by using the gradients of the first to fourth line elements L1 to L4.

Figure 9C:
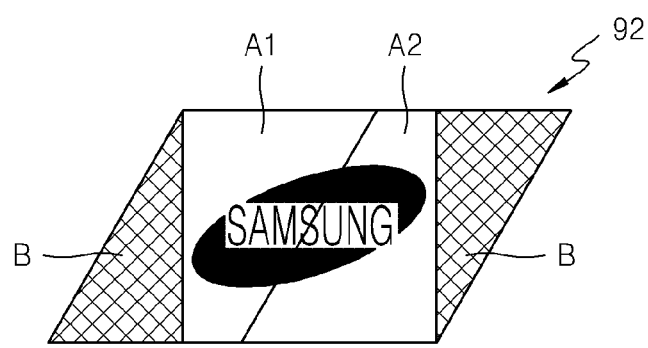
FIG. 9C shows an image displayed on a plurality of discrete regions according to another embodiment of the present invention.

FIG. 9C shows an image displayed on the first and second discrete regions A1 and A2, according to another embodiment of the present invention. Referring to FIG. 9C, the first and second discrete regions A1 and A2 have a parallelogram shape as shown in FIG. 8A, and thus the entire display area shown in the modified display device 100' may have a rectangular shape. In this case, the output signal generating unit 232, in outputting the output signal, may allow the image, which is divided into at least two discrete regions and displayed, to be modified to be appropriate for the parallelogram shape of the first and second discrete regions A1 and A2 and displayed. For example, the output signal generating unit 232 may set a coordinate of the image displayed on the plurality of discrete regions in consideration of gradients of lines contacting the first and second discrete regions A1 and A2.

For example, the output signal generating unit 232 may determine sub-images to be displayed on the first and second discrete regions A1 and A2 in consideration of the shape of the first and second discrete regions A1 and A2, determine a coordinate on the display area in which the sub-images are to be displayed, and generate an output signal for displaying the sub-images in the first and second discrete regions A1 and A2 according to coordinate information of the determined sub-images. In this case, the sub-images may constitute one image 92 according to the modified shape of the display device, and the image 92 may have characteristics, for example, a resolution, varying based on the shape of the first and second discrete regions A1 and A2 seen by a user according to the modified shape of the display device.

Referring to FIG. 9C, the output signal generating unit 232 may divide the image 92 into a plurality of sub-images in consideration of the gradients of the lines contacting the first and second discrete regions A1 and A2, and may generate the output signal for displaying the divided sub-images in the first and second discrete regions A1 and A2. The gradients of the lines contacting the first and second discrete regions A1 and A2 may be determined by using the gradients of the first to fourth line elements L1 to L4.

Figure 9D:
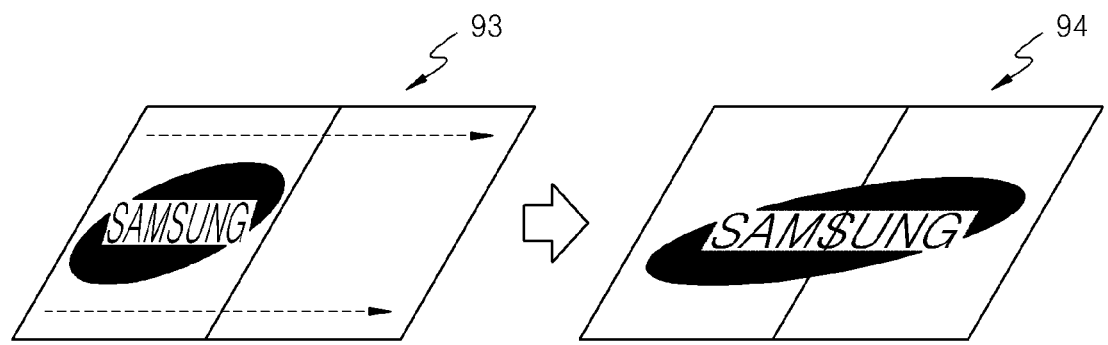
FIG. 9D shows an example in which a display area is controlled when first and second drag signals are input, according to an embodiment of the present invention.

FIG. 9D shows an example in which the display area is controlled when the first and second drag signals 221 and 222 are input, according to an embodiment of the present invention. Referring to FIG. 9D, if the first and second drag signals 221 and 222 are input when an image 93 is displayed on only some display areas, an image 94 may be divided into the first and second discrete regions A1 and A2 that are set by using the first and second drag signals 221 and 222 and displayed.

For this, the display area setting unit 231 may set the display area based on the first and second drag signals 221 and 222 that are input by a user, and the output signal generating unit 232 may generate an output signal for dividing an image and displaying the divided image in the at least two discrete regions that are set by the display area setting unit 231.

For example, the determination unit 220 may determine that the input signal is for expanding the display area, the display area setting unit 231 may expand the display area based on the first and second drag signals 221 and 222 that are input by a user, and the output signal generating unit 232 may generate the output signal for dividing an image and displaying the divided image in the at least two discrete regions that are included in the display area expanded by the display area setting unit 231.

Although the above-described method of setting the display area and the method of generating the output signal have been described by setting the discrete regions by using the first to fourth input signals 211 to 214 as a unit, the present invention is not limited thereto. The present invention may be used in a case of setting three or more discrete regions by using five or more input signals under different conditions. The above-described method of controlling the display area of the display area control unit 230 may be performed by using the same method of determining conditions with respect to the first to fourth input signals 211 to 214 even though the number of input signals exceeds four. Thus, the display area may be controlled by using at least five input signals.

For example, the display area control unit 230 may set the display area by using the input signals that are determined to be signals for controlling the display area by the determination unit 220.

Even though the number of input signals exceeds four, if the determination unit 220 determines that the input signals are for controlling the display area, the method of controlling the display area of the display area control unit 230 may be performed with respect to at least two discrete regions. For example, if the number of input signals are six, three discrete regions may be controlled as discrete regions constituting the display area, and if the number of input signals are eight, four discrete regions may be controlled as discrete regions constituting the display area.

The number of input signals may vary according to the number of times the flexible display device is wound into a spiral shape. Also, even though the number of times the flexible display device is wound into a spiral shape is fixed, the number of input signals may vary according to a user's input. The above-described method of controlling the display area may also be used when the number of input signals varies.

For example, in the flexible display device that is wound into a spiral shape at least three times, the determination unit 220 may determine that some input signals, which are input by a user, are for controlling the display area, and thus the display area setting unit 231 may set the display area by using the signals, which are determined by the determination unit 220, to be signals for controlling the display area. In this case, in the flexible display device that is wound into a spiral shape at least three times, only some discrete regions may constitute the display area, and thus a user may input the drag signal to only the some discrete regions.

Accordingly, on the same principle as an example in which an image displayed on one discrete region is divided into two discrete regions and displayed as shown in FIG. 9D, an image displayed on a first display area may be displayed on a second display area by using a signal that is input by a user. The first display area and the second display area may have different numbers of discrete regions.

Figure 10:
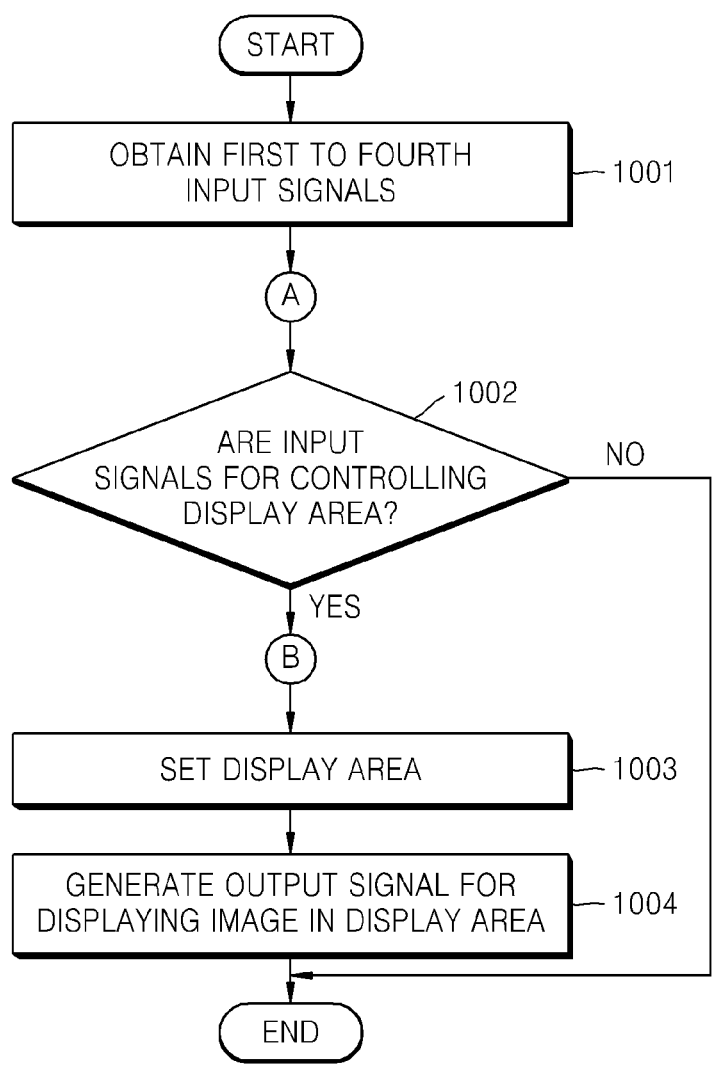
FIG. 10 is a flowchart describing a method of controlling a display area according to an embodiment of the present invention.

FIG. 10 is a flowchart for describing a method of controlling the display area, according to an embodiment of the present invention. Referring to FIG. 10, in operation 1001, the signal obtaining unit 210 obtains the first to fourth input signals 211 to 214. For example, in operation 1001, the signal obtaining unit 210 obtains the first to fourth input signals 211 to 214 that are input to the display unit 100 by a user's touch and respectively correspond to the first to fourth line elements L1 to L4 on the display unit 100. The first to fourth line elements L1 to L4 may be connected from any one of the first edge portion 110 of the display unit 100 and the second edge portion 120 facing the first edge portion 110 to the other one, and the first to fourth line elements L1 to L4 may face one another.

The flexible display device may be modified into a spiral structure, and the first to fourth input signals 211 to 214 may be input by a user's successive touches corresponding to a spin-axis direction of the spiral structure. Alternatively, the first drag signal 221 including the first input signal 211 and the third input signal 213, and the second drag signal 222 including the second input signal 212 and the fourth input signal 214 may be input by a user's successive touches.

In operation 1002, the determination unit 220 determines whether the input signals are for controlling the display area. For example, in operation 1002, the determination unit 220 determines whether the input signals are for controlling the display area by using the time when the first to fourth input signals 211 to 214 obtained in operation 1001 are input and the similarity of the gradients of the first to fourth line elements L1 to L4.

In operation 1003, the display area setting unit 231 sets the display area. For example, in operation 1003, the display area setting unit 231 sets the display area based on a closed loop composed of the obtained first to fourth line elements L1 to L4 and the first and second edge portions 110 and 120 if the determination unit 220 determines that the input signals are for controlling the display area in operation 1002.

The display area may include at least two discrete regions that are spaced apart from each other on the display unit.

Alternatively, in operation 1003, the display area setting unit 231 may set the first discrete region A1 in the internal area of the first closed loop composed of the first and second line elements L1 and L2 and the first and second edge portions 110 and 120, and may set the second discrete region A2 in the internal area of the second closed loop composed of the third and fourth line elements L3 and L4 and the first and second edge portions 110 and 120.

Alternatively, in operation 1003, the display area setting unit 231 may set the first discrete region A1 included in the internal area of the first closed loop and the second discrete region A2 included in the internal area of the second closed loop in consideration of the gradients of the first to fourth line elements L1 to L4.

In operation 1004, the output signal generating unit 232 generates an output signal for displaying an image in the display area. For example, the output signal generating unit 232 may generate an output signal for dividing an image and displaying the divided image in at least two discrete regions that are set in operation 1003.

Figure 11:
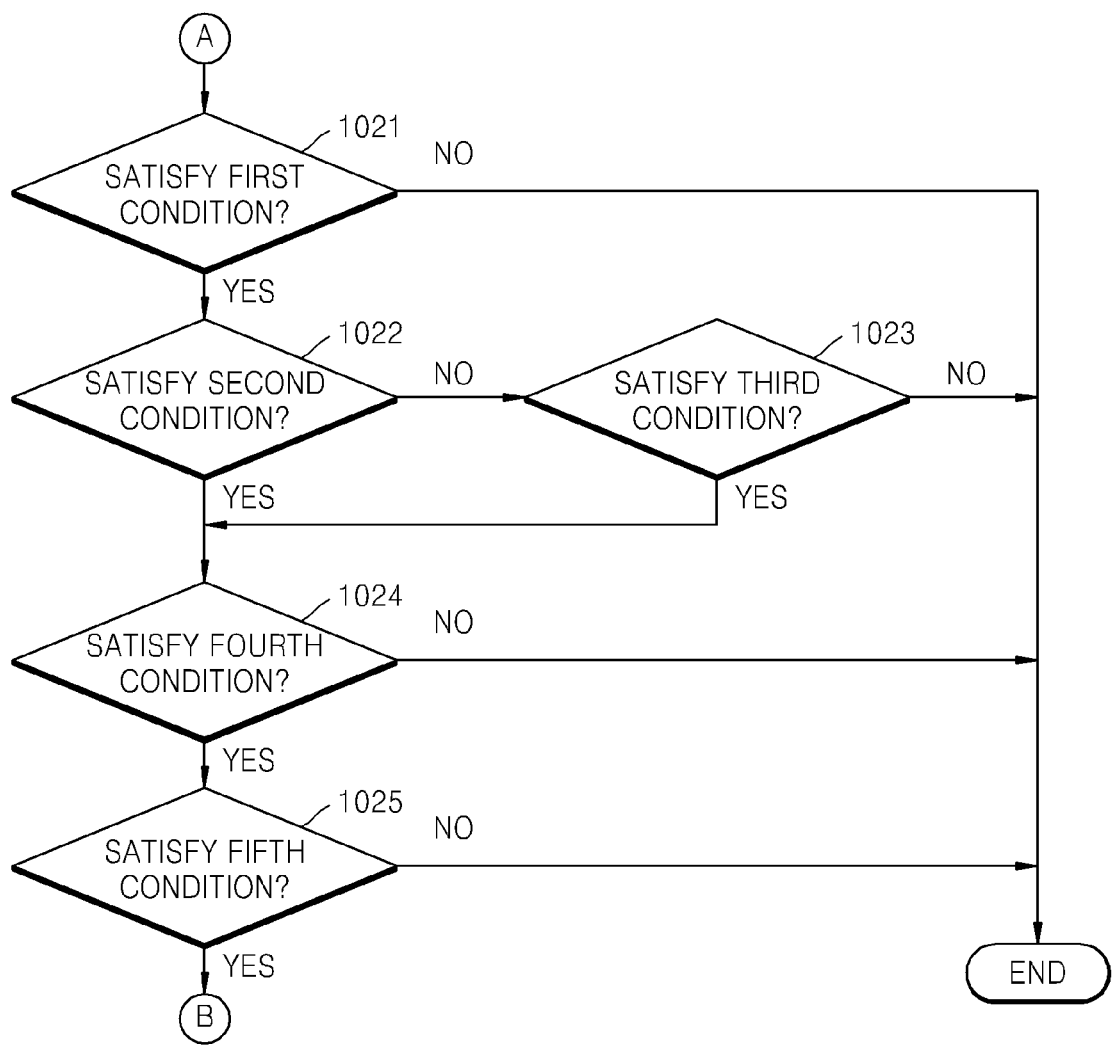
FIG. 11 is a flowchart showing operation 1002 shown in FIG. 10 in detail.

FIG. 11 is a flowchart showing operation 1002 shown in FIG. 10 in detail. Referring to FIG. 11, in operation 1021, the determination unit 220 may determine whether the input signals satisfy the first condition. For example, in operation 1021, the determination unit 220 may determine that the input signals are for controlling the display area if a difference in time between when an input of the first input signal 211 is finished and when an input of the third input signal 213 starts and a difference in time between when an input of the second input signal 212 is finished and when an input of the fourth input signal 214 starts are below the first threshold time. In operation 1021, if the input signals do not satisfy the first condition, the process ends. In operation 1021, if it is determined that the input signals satisfy the first condition, the process proceeds to operation 1022.

In operation 1022, the determination unit 220 may determine whether the input signals satisfy the second condition. For example, in operation 1022, the determination unit 220 may determine that the input signals are for controlling the display area if a difference in time between when inputs of the first and second drag signals 221 and 222 start and a difference in time when inputs of the first and second drag signals 221 and 222 are finished are below the second threshold time. In operation 1022, if the input signals do not satisfy the second condition, the process proceeds to operation 1023. Otherwise, in operation 1022, if it is determined that the input signals satisfy the second condition, the process proceeds to operation 1024.

In operation 1023, the determination unit 220 may determine whether the input signals satisfy the third condition. For example, in operation 1023, the determination unit 220 may determine that the input signals are for controlling the display area if the input of the second drag signal 222 starts within the third threshold time after the input of the first drag signal 221 is finished. In operation 1023, if the input signals do not satisfy the third condition, the process ends. Otherwise, in operation 1023, if it is determined that the input signals satisfy the third condition, the process proceeds to operation 1024.

In operation 1024, the determination unit 220 may determine whether the input signals satisfy the fourth condition. For example, in operation 1024, the determination unit 220 may determine that the input signals are for controlling the display area if the time to input all the input signals is below the fourth threshold time. In operation 1024, if the input signals do not satisfy the fourth condition, the process ends. In operation 1024, if it is determined that the input signals satisfy the fourth condition, the process proceeds to operation 1025.

In operation 1025, the determination unit 220 may determine whether the input signals satisfy the fifth condition. For example, in operation 1025, the determination unit 220 may determine that the input signals are for controlling the display area if a difference between the gradients of the first to fourth line elements L1 to L4 is within a margin of error. In operation 1025, if the input signals do not satisfy the fifth condition, the process ends. Otherwise, in operation 1025, if it is determined that the input signals satisfy the fifth condition, the process proceeds to operation 1003.

However, even though the input signals do not satisfy the condition shown in FIG. 11 under different conditions, if the input signals satisfy any one of the first to fifth conditions, the determination unit 220 may determine that the input signals are for controlling the display area. Alternatively, the determination unit 220 may determine that the input signals are for controlling the display area if the input signals satisfy at least one of the first to fifth conditions. Alternatively, the determination unit 220 may omit any one of operations 1021 to 1025 shown in FIG. 11. The determination of which operation among operations 1021 to 1025 should be omitted is performed in various ways under different conditions.

For example, the second condition is a condition where the first and second drag signals 221 and 222 are simultaneously input, and the third condition is a condition where the first and second drag signals 221 and 222 are sequentially input, and thus the determination unit 220 may determine that the input signals are for controlling the display area if the first and second drag signals 221 and 222 satisfy any one of the second condition and the third condition.

Also, the locations of blocks shown in the flowchart of FIG. 11 may be changed, and thus the order of determining whether the input signals satisfy the conditions may be changed. The order of determining whether the input signals satisfy the conditions may be set in various ways under different conditions.

Although the above-described operations have been described by setting two discrete regions as a unit, the present invention is not limited thereto. The present invention may be used in a case of setting three or more discrete regions under different conditions. For example, the above-described various conditions have been described based on the method of controlling the display area using the first to fourth input signals 211 to 214, but the present invention is not limited thereto. The above-described conditions of the determination unit 220 may be performed by using the same method of determining conditions with respect to the first to fourth input signals 211 to 214 even though the number of input signals exceeds four. Thus, the display area may be controlled by using at least five input signals.

For example, the determination unit 220 may generate a first group of the first to fourth input signals 211 to 214, a second group of third to sixth input signals, and a third group of fifth to eighth input signals, and may determine whether the first to sixth input signals satisfy the conditions by applying the above-described method of determining whether the first to fourth input signals satisfy the conditions to each of the first to third groups.

At this time, if any one of the first to third groups does not satisfy the conditions, the determination unit 220 does not determine whether the input signals satisfy the conditions with respect to the remaining groups and determines that a user's input is not for controlling the display area, and thus the process may be finished.

Alternatively, if only some of the groups satisfy the conditions, the determination unit 220 may determine that signals of the groups satisfying the conditions are for controlling the display area. In this case, the display area setting unit 231 may set the display area by using a signal for controlling the display area.

Even though the number of input signals exceeds four, if the determination unit 220 determines that the input signals are for controlling the display area by using the above-described method, the above-described method of controlling the display area of the display area control unit 230 may be performed on at least two discrete regions. For example, if the number of input signals are six, three discrete regions may be controlled as discrete regions constituting the display area, and if the number of input signals are eight, four discrete regions may be controlled as discrete regions constituting the display area.

The number of input signals may vary according to the number of times the flexible display device is wound into a spiral shape. Also, even though the number of times the flexible display device is wound into a spiral shape is fixed, the number of input signals may vary according to a user's input. The above-described method of controlling the display area may also be used when the number of input signals varies.

For example, in the flexible display device that is wound into a spiral shape at least three times, the determination unit 220 may determine that some input signals, which are input by a user, are for controlling the display area, and thus the display area setting unit 231 may set the display area by using the signals, which are determined by the determination unit 220, to be signals for controlling the display area. In this case, in the flexible display device that is wound into a spiral shape at least three times, only some discrete regions may constitute the display area, and thus a user may input the drag signal to only the some discrete regions.

Accordingly, on the same principle as an example in which an image displayed on one discrete region is divided into two discrete regions and displayed as shown in FIG. 9D, an image displayed on the first display area may be displayed on the second display area by using a signal input by a user. The first display area and the second display area may have different numbers of discrete regions.

According to one or more embodiments of the present invention, a display area may be controlled so as to be appropriate for a state of a flexible display device by using an input signal input by a user's touch.

The present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

As described above, the method and the apparatus for controlling the display area of the flexible display device constructed as embodiments according to the principles of the present invention may allow the flexible display device to provide an expanded display area. Accordingly, the display area may be enlarged in accordance with a user's preference or an environment requirement.

While the present invention has been particularly shown and described with reference to exemplary embodiments thereof, it will be understood by one of ordinary skill in the art that various changes in form and details may be made therein without departing from the spirit and scope of the present invention as defined by the following claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a flexible display device, comprising:
    obtaining from a display unit to which users' touches are input for the flexible display device having a display area presenting variable visual images for the flexible display device, a first input signal, a second input signal, a third input signal, and a fourth input signal input to the display unit by a user's touch and respectively corresponding to a first line element, a second line element, a third line element, and a fourth line element, each of the first through fourth line elements connected between a first edge portion and a second edge portion spaced-apart from the first edge portion of the display unit;
    making a determination of whether the first through fourth input signals are for controlling the display area by using a time when the first through fourth input signals are input or by using a similarity of gradients of the first through fourth line elements; and
    setting the display area based on a closed loop comprised of the first through fourth line elements and the first and second edge portions of the display unit, when the determination indicates that the first through fourth input signals are for controlling the display area.

2. The method of claim 1, wherein the determination of whether the first through fourth input signals are for controlling the display area comprises making a determination based upon whether a difference in time between when an input of the first input signal is completed and when an input of the third input signal starts and a difference in time between when an input of the second input signal is completed and when an input of the fourth input signal starts are below a first threshold time.

3. The method of claim 1, wherein:
    a first drag signal comprises the first input signal and the third input signal, and a second drag signal comprises the second input signal and the fourth input signal; and
    the determination of whether the first through fourth input signals are for controlling the display area comprises making a determination based upon whether a difference in time between starts of inputs of the first and second drag signals and a difference in time between completion of inputs of the first and second drag signals are below a second threshold time.

4. The method of claim 1, wherein:
    a first drag signal comprises the first input signal and the third input signal, and a second drag signal comprises the second input signal and the fourth input signal; and
    the determination of whether the first through fourth input signals are for controlling the display area comprises making a determination based upon whether the input of the second drag signal starts within a third threshold time after the input of the first drag signal is completed.

5. The method of claim 1, wherein:
    a first drag signal comprises the first input signal and the third input signal, and a second drag signal comprises the second input signal and the fourth input signal; and
    the flexible display device is modified into a spiral structure, and the first drag signal and the second drag signal are input by a user's successive touches in accordance with a spin-axis direction of the spiral structure.

6. The method of claim 1, wherein the display area comprises at least two discrete regions that are spaced apart from each other on the display unit, and the setting of the display area comprises setting a first discrete region from an internal area of a first closed loop comprised of the first and second line elements and the first and second edge portions, and setting a second discrete region from an internal area of a second closed loop comprised of the third and fourth line elements and the first and second edge portions.

7. The method of claim 6, further comprising generating an output signal for dividing an image and displaying the divided image in the at least two of the discrete regions that are set by the setting of the display area.

8. The method of claim 7, wherein the setting of the display area comprises setting the first discrete region comprised in the internal area of the first closed loop and the second discrete region comprised in the internal area of the second closed loop in consideration of the gradients of the first through fourth line elements.

9. The method of claim 1, wherein the determination of whether the first through fourth input signals are for controlling the display area comprises making a determination based upon whether a time to input all the first through fourth input signals is below a fourth threshold time.

10. The method of claim 1, wherein the determination of whether the first through fourth input signals are for controlling the display area comprises making a determination based upon whether a difference between the gradients of the first through fourth line elements is within a margin of error.

11. The method of claim 1, wherein:
    a first drag signal comprises the first input signal and the third input signal, and a second drag signal comprises the second input signal and the fourth input signal; and
    the setting of the display area comprises setting an orientation of the display area in accordance with an input order of the first drag signal and the second drag signal.

12. A non-transitory computer-readable recording medium having embodied thereon a computer program for causing a computer system to execute the method of claim 1.

13. An apparatus for controlling a flexible display device, comprising:
    a signal obtaining unit obtaining from a display unit to which users' touches are input for the flexible display device having a display area presenting variable visual images for the flexible display device, a first input signal, a second input signal, a third input signal, and a fourth input signal input to the display unit by a user's touch and respectively corresponding to a first line element, a second line element, a third line element, and a fourth line element on the display unit, each of the first through fourth line elements connected between a first edge portion and a second edge portion spaced-apart from the first edge portion of the display unit;

a determination unit determining whether the first through fourth input signals are for controlling the display area by using a time when the first through fourth input signals obtained are input or by using a similarity of gradients of the first through fourth line elements; and a display area setting unit setting the display area based on a closed loop comprised of the first through fourth line elements and the first and second edge portions of the display unit, when the determination unit determines that the first through fourth input signals are for controlling the display area.

14. The apparatus of claim 13, wherein the determination unit determines whether the input signals are for controlling the display area based upon whether a difference in time between when an input of the first input signal is completed and when an input of the third input signal starts and a difference in time between when an input of the second input signal is completed and when an input of the fourth input signal starts are below a first threshold time.

15. The apparatus of claim 13, wherein:
a first drag signal comprises the first input signal and the third input signal, and a second drag signal comprises the second input signal and the fourth input signal; and
the determination unit determines whether the input signals are for controlling the display area based upon whether a difference in time between when inputs of the first and second drag signals start and a difference in time when inputs of the first and second drag signals are completed are below a second threshold time.

16. The apparatus of claim 13, wherein:
a first drag signal comprises the first input signal and the third input signal, and a second drag signal comprises the second input signal and the fourth input signal; and
the determination unit determines whether the input signals are for controlling the display area based upon whether the input of the second drag signal starts within a third threshold time after the input of the first drag signal is completed.

17. The apparatus of claim 13, wherein:
a first drag signal comprises the first input signal and the third input signal, and a second drag signal comprises the second input signal and the fourth input signal; and the flexible display device is modified into a spiral structure, and the first drag signal and the second drag signal are input by a user's successive touches in accordance with a spin-axis direction of the spiral structure.

18. The apparatus of claim 13, wherein the display area comprises at least two discrete regions that are spaced apart from each other on the display unit, and the display area setting unit sets a first discrete region from an internal area of a first closed loop composed of the first and second line elements and the first and second edge portions, and sets a second discrete region from an internal area of a second closed loop composed of the third and fourth line elements and the first and second edge portions.

19. The apparatus of claim 18, further comprising an output signal generating unit for generating an output signal for dividing an image and displaying the divided image in the at least two discrete regions that are set by the display area setting unit.

20. The apparatus of claim 19, wherein the display area setting unit sets the first discrete region comprised in the internal area of the first closed loop and the second discrete region comprised in the internal area of the second closed loop in consideration of the gradients of the first through fourth line elements.

21. The apparatus of claim 13, wherein the determination unit determines whether the input signals are for controlling the display area based upon whether a time to input all the first through fourth input signals is below a fourth threshold time.

22. The apparatus of claim 13, wherein the determination unit determines whether the input signals are for controlling the display area based on whether a difference between the gradients of the first through fourth line elements is within a margin of error.

23. The apparatus of claim 13, wherein:
a first drag signal comprises the first input signal and the third input signal, and a second drag signal comprises the second input signal and the fourth input signal; and
the display area setting unit sets an orientation of the display area in accordance with an input order of the first drag signal and the second drag signal.

* * * * *